Feb. 2, 1937.                G. L. HUNT                2,069,249
APPARATUS FOR GAUGING AND STRAIGHTENING AUTOMOBILES AND PARTS THEREOF
                     Filed Oct. 27, 1930         7 Sheets-Sheet 1

G. L. HUNT  INVENTOR.

BY Merrill M. Blackburn.
ATTORNEY

Feb. 2, 1937. G. L. HUNT 2,069,249
APPARATUS FOR GAUGING AND STRAIGHTENING AUTOMOBILES AND PARTS THEREOF
Filed Oct. 27, 1930 7 Sheets-Sheet 3

G. L. HUNT INVENTOR.

BY Merrill M. Blackburn
ATTORNEY

Feb. 2, 1937.   G. L. HUNT   2,069,249
APPARATUS FOR GAUGING AND STRAIGHTENING AUTOMOBILES AND PARTS THEREOF
Filed Oct. 27, 1930   7 Sheets-Sheet 7

G. L. HUNT INVENTOR.
BY Merrill M. Blackburn
ATTORNEY.

Patented Feb. 2, 1937

2,069,249

UNITED STATES PATENT OFFICE 2,069,249

APPARATUS FOR GAUGING AND STRAIGHTENING AUTOMOBILES AND PARTS THEREOF

George L. Hunt, Davenport, Iowa, assignor, by mesne assignments, to A. E. Feragen, Inc., Seattle, Wash., a corporation of Washington Application October 27, 1930, Serial No. 493,561

22 Claims. (Cl. 153—32)

The present invention relates to means for determining whether or not the chassis of an automobile is in proper form and, if not, the amount by which it deviates from such form, and, also, to means for restoring the chassis to the form which it is intended to have. Among the objects of this invention are the following: To provide means whereby a quick and accurate test may be made to determine the correctness of form of an automobile chassis; to provide a rigid gauging frame upon which the machine to be tested may be mounted and quickly tested; to provide a rigid construction of the character indicated which will securely hold an automobile when it is being tested and adjusted to proper form; to provide an efficient construction whereby an automobile may be quickly and accurately tested as to its correctness of form and, if incorrect in form, may be quickly adjusted to proper form; to provide in connection with a gauging frame of the character indicated suitable implements which will cooperate with the frame in testing the chassis of an automobile with respect to whether or not it is in correct or incorrect form; to provide in conjunction with a frame of the character indicated proper implements for working upon an automobile chassis to put the elements thereof in proper shape and adjust them to have proper relations with respect to each other; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be construed in a limiting sense.

In the drawings annexed hereto and forming a part hereof, Figs. 10 and 11 are fragmentary vertical sections taken substantially along the plane indicated by the lines 10—10 and 11—11, Fig. 9; Fig. 12 is a perspective view of a plate shown in elevation in Fig. 10; Figs. 23 and 24 are vertical sectional elevations illustrating another form of holding means in two different positions of use.

Figure 1:
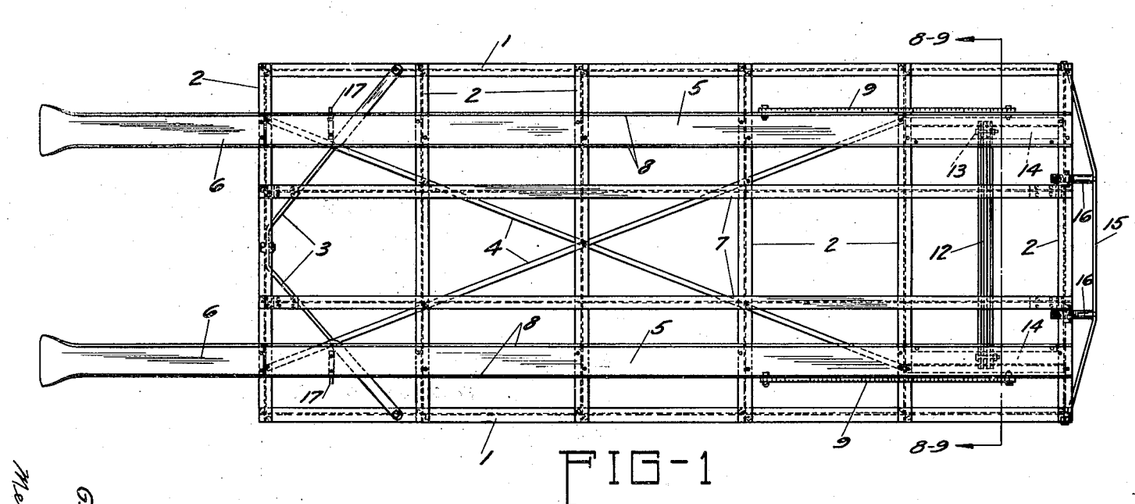
Fig. 1 is a plan view of the supporting framework of my device.
Figure 2:
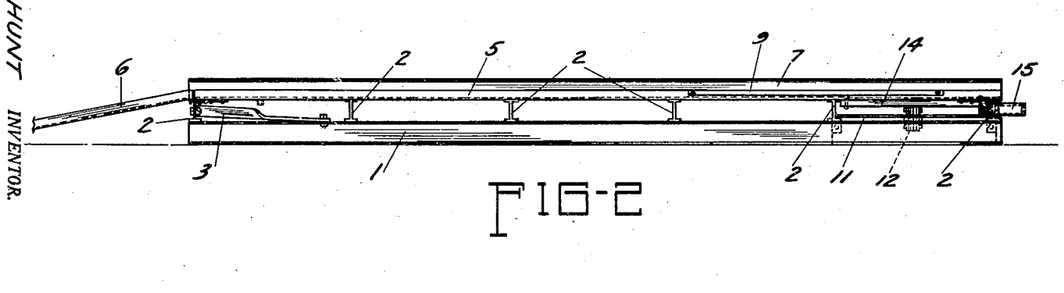
Fig. 2 is a side elevation of the structure shown in Fig. 1.

Reference will now be made in greater detail to the annexed drawings wherein there is shown a channel iron or I-beam frame rigidly secured together and then braced and upon which are secured a pair of runways intended to receive an automobile to be tested. Reference will be made first more particularly to Figs. 1, 2, 8 and 9 in which there are shown a pair of I-beams 1 extending lengthwise of the frame and parallel to each other. Mounted upon these I-beams are a plurality of cross I-beams 2 which are rigidly secured to the beams 1 and hold them securely in place with relation to each other. Braces 3 and 4 are provided which rigidly hold the frame against racking in a horizontal direction, the braces 3, as shown in Fig. 2, being secured to one of the cross bars 2 and the two I-beams 1. The braces 4 are secured to as many as desired of the cross beams 2, preferably to the cross beams at the ends of the braces and to all of the cross beams between these.

Mounted upon and rigidly secured to the cross beams 2 are channel runways 5 which extend from end to end of the frame. Detachable extensions 6 are attached to one of the end cross bars and extend downwardly as indicated in Figs. 1 and 2 to form approaches whereby an automobile may be run up onto the framework to be tested. It will therefore be seen that with the device set up as illustrated in Figs. 1 and 2 a car may be run up on the framework with the tires resting in the channels 5 and then the desired measurements and operations may be made.

Mounted on the cross bars 2 and movable transversely with respect thereto are a pair of I-beams 7 which will be referred to more in detail in connection with the description of the operation of the machine. The channels 5 are shown as having side walls 8 to assist in keeping the automobile wheels from running off to one side or the other. To the outer ones of these side walls are secured gauge bars 9 by means of which comparative measurements of the front wheels and axle ends may be made. These gauge bars are accurately positioned on the channels 5 and the lines thereon may therefore be taken as index points from which to measure when checking the trueness of the frame of the car.

Figures 8, 13, 14, 15, 16, 17:
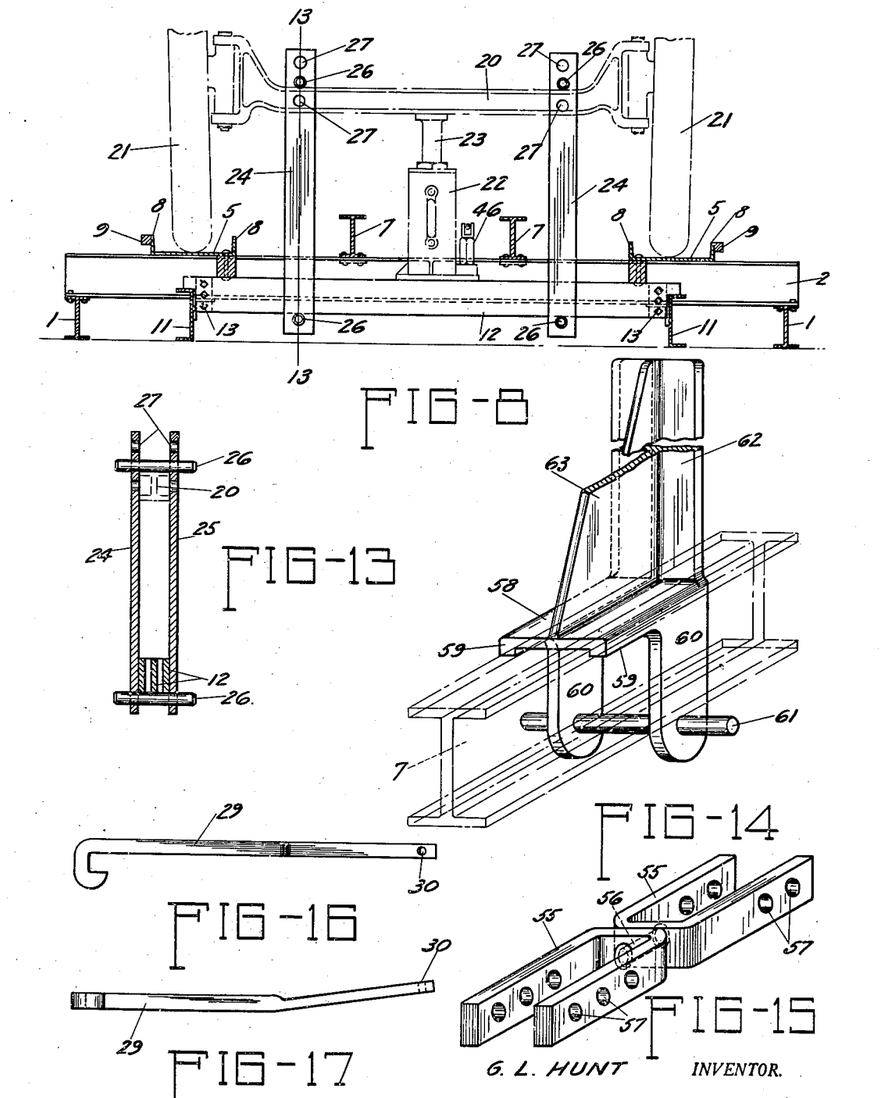
Fig. 8 is a fragmentary transverse section taken substantially along the plane indicated by the line 8—8 Fig. 1 illustrating the use of a certain piece of apparatus in straightening an automobile axle.
Fig. 13 is a vertical section through a clamp illustrated in Fig. 8, the same being taken substantially along the plane indicated by the line 13—13 in this figure.
Fig. 14 is a broken perspective view of a piece of apparatus used in the holding of an automobile in place upon the frame.
Fig. 15 is a perspective view of another piece of apparatus, the same being shown in use in Fig. 7.
Figs. 16 and 17 are respectively side and edge views of certain holding members illustrated in Figs. 9 and 10.
Figure 9:
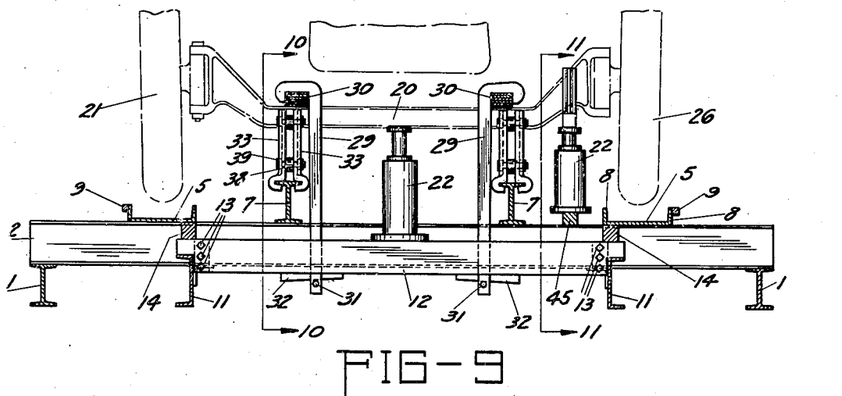
Fig. 9 is a similar view taken along the same plane as Fig. 8 and illustrating the use of other apparatus for removing torsional twists from an axle.
Figure 22:
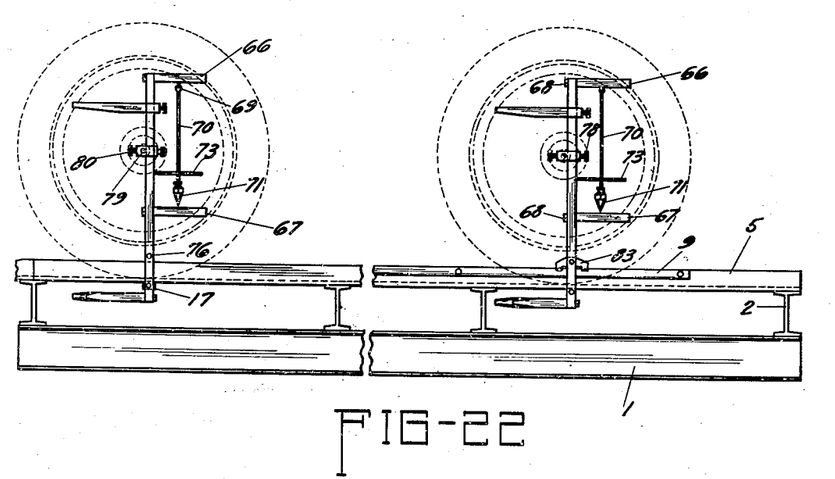
Fig. 22 shows the use of this testing device in connection with two wheels, one being illustrated at the rear end of the testing frame and the other at the forward end thereof.

A pair of channel bars 11 are notched out as indicated at 10 (Figure 10) to be received on the lower internal flanges of cross bars 2 at the forward end of the frame. These channel irons 11 extend downwardly and rest upon the same support as the I-beams 1 (the floor) and may therefore help somewhat in supporting the weight of the frame and the automobile. Resting upon and slidable along the channels 11 is a composite bar 12, made up as indicated in Fig. 1 of a plurality of layers having spacer blocks arranged between their ends and having bolts passed therethrough as indicated at 13 in Figs. 1, 8 and 9. As shown in Figs. 8 and 9, the ends of these bars may be notched out where they rest upon the channels 11, though it will be understood that this is not necessary unless the bars are wider than the space between the channels 11 and 5. I have shown hold-down bars 14 between the tops of the bars 12 and the bottoms of the channels 5 which hold the bars 12 down during certain operations with this apparatus. At the forward end of the frame is an arched brace 15 which is secured to one of the cross bars 2 and is tightened by means of the screw-threaded posts 16, as shown most clearly in Fig. 1. Adjacent the rear of the machine and secured, preferably, to the channels 5 are a pair of supports 17 which serve as index points from which to measure when testing the correctness of form of the automobile frame. The ends of these members 17 which project beyond the channels 5 are preferably cylindrical in form and receive thereon a testing instrument as shown in Fig. 22. The construction and operation of the tool shown in Figs. 18 to 22 will be given more in detail hereinafter.

Reference will now be made to sheet 4 of the drawings for a description of some of the implements used in connection with the framework described heretofore. The front axle of an automobile is designated by the numeral 20 and the front wheels by the numeral 21. A jack 22 is shown as resting upon the composite bar 12 and having its ram 23 engaging the under side of the axle 20. This is the position for straightening an axle which has sagged in the middle, whether from one cause or another. In order to hold the axle down so that it will not be raised when force is applied to the jack 22, the hold-down means 24 is applied to the bar 12 and axle 20. The hold-down means comprises a pair of bars 25 and a pair of pins 26. The bars 25 are provided with a plurality of perforations 27 for the reception of the pins 26. As shown in Fig. 13, one of the pins 26 passes underneath the bar 12 and the other one passes above the axle 20. The perforations 27 provide a certain amount of adjustment to accommodate cars in which the axles are different distances from the ground. It will therefore be seen that if one of the upper holes 27 is too low for the pin 26 to pass therethrough and above the axle 20, the pin can be slipped through the next higher hole. Therefore, though the axle may be permitted to rise somewhat due to the lifting pressure of the jack, it will reach a time when the links 24 and pins 26 will prevent further movement of the two ends of the axle and further movement of the jack will cause the axle to be bent somewhere between the ends, depending upon the position of the jack 22. If the bend which it is desired to straighten is in the middle of the axle, the parts will be positioned as illustrated in Fig. 8. However, if the bend is nearer to one end or the other, the jack 22 will be moved accordingly so as to place it beneath the bent portion.

Figures 1, 10, 12, 23, 24:
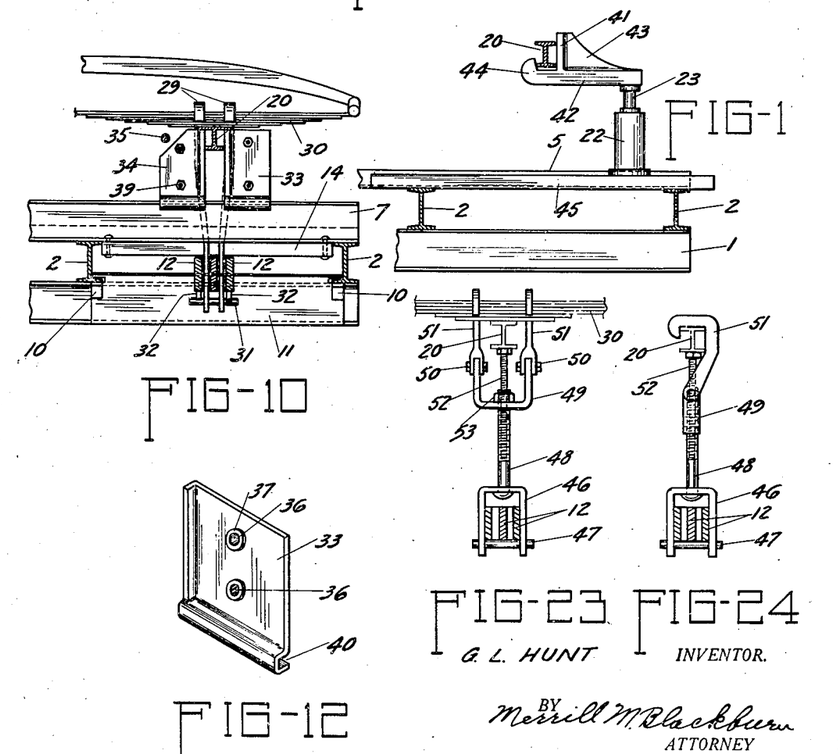

Other hold-down apparatus for holding the axle down against the lifting force of the jack 22 is illustrated in Figs. 9, 10, 15, 16, 17, 23 and 24. That shown in Figs. 9, 10, 16, and 17 will next be described. This comprises a plurality of hooks provided with elongated shanks, as illustrated at 29. As illustrated in Figs. 9 and 10 these hooks engage over the tops of the front springs 30 and extend downwardly between the layers of the bar 12. In order to do this, it is necessary that they be somewhat offset as illustrated in Fig. 17. As shown at 30, holes are provided for the passage of pins 31 whose function is to prevent the axle from being raised by the jack 22 when force is applied thereto. I have illustrated wedges 32 which are driven in between the pins 31 and the bar 12 so as to draw the hooks 29 downwardly into tight engagement with the springs 30. In order to block up the axle and rigidly support the same, without strain coming upon the ends thereof, when bending of said axle is taking place, plates 33 and 34 may be used. These plates are identical except that a corner is cut off from each plate 34 so as to avoid the tie rod 35 of the automobile steering mechanism. As shown clearly in Fig. 12, the plates are provided with perforations 36 through which pass bolts to secure the plates together in pairs. These plates have bosses 37 on their inner faces, surrounding the perforations 36, and sleeve 38 surrounds the bolts 39 and holds the plates properly spaced apart. As clearly illlustrated in Figs. 9 and 12, the lower edges of the plates are provided with grooves 40 which engage the upper flanges of the I-beams 7. These are therefore thoroughly gripped and the plates serve as supporting means for supporting the axle on the frame. From the foregoing it will be apparent that the plates 33 and 34 sustain the axle with relation to the frame and the hooks 29 draw the axle down upon the plates and hold it from rising when a lifting force is applied by the jack.

At the right of Fig. 9 and in Fig. 11 a jack 22 is shown in position to apply a torsional strain to the end of an axle when the same has become so twisted that the axes of the two steering knuckles do not lie in the same plane. By twisting the axle in one direction or the other, it will be possible to bring the two axes into a common plane. This device comprises a pair of arms 41 and 42, preferably connected at substantially a right angle to each other and braced with relation to each other by a web 43. Upon one end of the arm 42 and cooperating with the arm 41 is a hook 44 which engages one flange of the axle 20, the diagonally opposite flange of this axle being engaged by the arm 41. Therefore, when the ram 23 of jack 22 is lifted with the parts in the position shown in Fig. 11, and the jack resting upon a support 45, force can be transmitted to the arm 42 to cause twisting of the axle. Though the jack is shown complete in Fig. 8, it is not so illustrated in Figs. 9 and 11. However, it will be understood that some sort of a force applying means must be provided. In Fig. 8 I have shown a jack as provided with a pump 46, this jack being here illustrated as of the hydraulic type. It is believed to be unnecessary to explain the construction of Fig. 11 in further detail.

The structure shown in Figs. 23 and 24 is a modification of those shown in Figs. 8, 9 and 10. In this construction, a yoke 46 straddles a bar 12 and has a pin 47 passed therethrough to prevent the yoke from being pulled away from the bar. This yoke has a bolt 48 passed through a perforation in the central portion thereof, the other end of the bolt being passed through a corresponding perforation in a second yoke 49. The ends of this yoke are perforated for the reception of pivot bolts 50 by means of which a pair of hooks 51 are pivotally connected to the yoke. These hooks may be hooked over a spring 30 as illustrated in Fig. 23 or over an axle 20 as illustrated in Fig. 24. The bolt 48 is illustrated as being centrally drilled and tapped for the reception of a bolt 52 which may be screwed out so that its head engages the under side of the axle 20 to hold the hooks and spring or hooks and axle rigidly connected. When it is desired to detach the hooks from the spring or axle, it is only necessary to screw the bolt 52 into the opening in bolt 48 sufficiently to permit detachment of the hooks from the spring or axle. It will be evident from these figures that if a lifting force be applied to the axle 20, this will be transmitted directly to the hooks 51, in the arrangement shown in Fig. 24, or indirectly to the hooks 51, through the spring 30, in the arrangement shown in Fig. 23. This lifting force will be prevented from raising the axle 20 to any appreciable extent by reason of the fact that the pin 47 is drawn up into engagement with the under side of the bar 12 by screwing the nut 53 down on bolt 48 until the parts are all tied together tightly. It is desired to call attention to the fact that the yokes 46 and 49 may lie in the same plane, as illustrated in Fig. 23, or in planes at right angles to each other, as illustrated in Fig. 24. Also, these yokes may be turned into positions at any other angle to each other.

The structure shown in Fig. 15 is in reality a combination of the two shown in Figs. 8, 13, 23 and 24. It comprises the yokes 55, corresponding to the yokes 46 and 49, said yokes being connected by any suitable linking means 56, in the present drawings being shown as a rivet. These yokes are illustrated as provided with perforations 57 through which a pin 47 may be passed to hold the yokes connected to the bar 12 and axle 20 or spring 30. In view of the fact that this is so similar to structures described above, it is not deemed necessary to go into further detail in connection therewith.

An implement which I term "a knee" is illustrated in Fig. 14 as applied to an I-beam. The use of this implement is illustrated in Figs. 3 to 7, inclusive. This implement comprises a plate 58 provided along its edges with flanges 59 and ears 60, the latter being perforated for the passage of a pin or rod 61. Rising from this plate is an arm 62 which is laterally braced with relation to the plate 58 by a web 63. It will therefore be seen that if pressure is applied against the plate 62 in the direction of the web 63 the pin 61 will rise against the under side of the I-beam as the edge of the plate presses against the opposite side of the I-beam. The flanges 59 serve to prevent the device from twisting about on the beam, as will be clear from Fig. 14. The use of this implement will be described further, presently.

The implement shown in Figs. 18 to 22 on Sheets 3 and 6 will next be described. This comprises a bar 65 having arms 66 and 67 rigidly connected thereto. Since it is not necessary that these be movable, they may be either rigidly connected to the body 65 or removably secured thereto by means of bolts 68 or any other convenient means. An eye 69 is secured to the arm 66 and from this depends a rod 70 which is pivoted thereto to swing in any direction. On the lower end of this rod is a bob 71 which has a point in close proximity to the upper surface of the arm 67 on which are marked graduations to indicate the number of degrees which the body 65 deviates from a plumb. While it is not necessary to adjust the length of the rod 70 and plumb bob 71, it is thought desirable to be able to adjust this if desirable. Therefore, it is preferred that the rod 70 be screwed into the plumb bob 71 and that a lock nut be provided thereon to hold the two against accidental rotation relatively to each other and to the rod 70. A loop 73 is mounted on the body 65 above the plumb bob 71 and prevents the bob from swinging an undesired distance away from the zero point. As illustrated in Fig. 20, the arms 66 and 67 are provided with notches 74 in the ends thereof, the same being designed to assist in measuring the inclination of the axis of the steering knuckle, this operation being illustrated in the present drawings.

A perforation 75 is provided near the lower end of the body 65, this perforation being designed for insertion of the supporting lug 17 referred to above. It will therefore be seen that when this implement is mounted upon the lug 17 the parts thereof will always have a certain height relationship with reference to the channel 5. However, this is not so important as the front to back relationship illustrated in Fig. 22. A bracket 77 is slidably mounted on the body 65 and is adjustably held in position by means of the set screw 78. It is therefore apparent that this can be adjusted to any desired height between the loop 73 and the adjustable arm above which will be presently referred to. This bracket 77 is perforated and has mounted therein a cross arm 79, the ends of which are reduced almost to points, the same being designed to engage the center depressions in the ends of the axles. This rod is adjustably held in position by means of the set screw 80 passing into the end of the bracket 77 and engaging the side of the rod 79. The use of this device is illustrated in Fig. 22. More as to use of this will be said presently.

Figure 18:
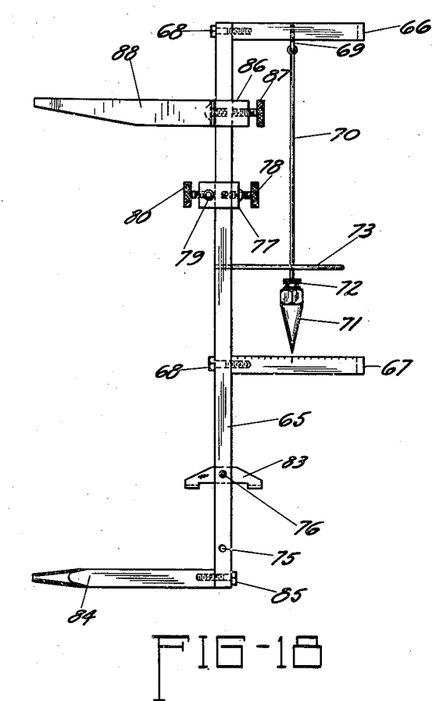
Figs. 18, 19 and 20 are elevations and a plan view of a certain testing appliance used in connection with this frame.
Figure 19:
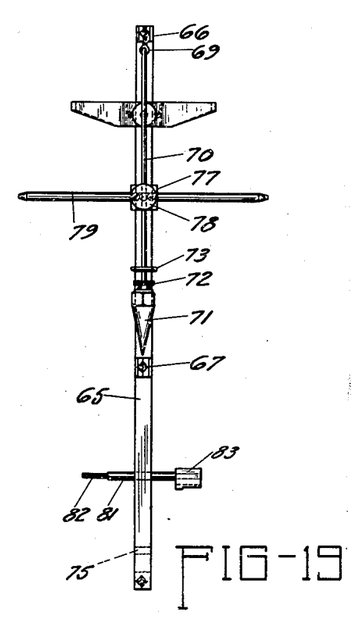
Figure 20:
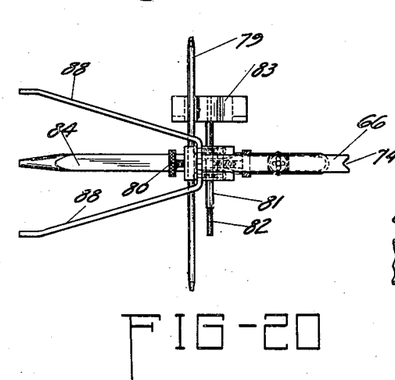

A support 81, having its ends reduced as illustrated at 82, is mounted in the opening 76 and is capable of receiving upon either end a shoe 83, illustrated in Figs. 18, 19 and 20. The cooperation of this shoe with the gauge rod 9, as illustrated in Fig. 22, will be explained more fully hereinafter.

Figure 21:
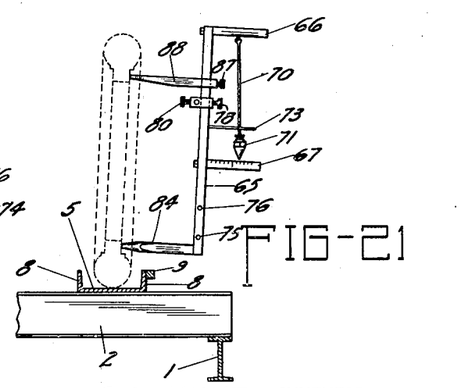
Fig. 21 is an elevation illustrating the use of this testing device.

Fixed in position adjacent the lower end of the body 65 is an arm 84 having a flat end and whose sides are tapered off as shown most clearly in Figs. 18 and 20. This is illustrated as being secured in position by means of a bolt 85, though other securing means may be used or the arm may be made integral with the body, if desired. Adjacent the upper end of the body 65 is a bracket 86 which is slidable on said body and which is adjustably secured in position by means of the set screw 87. Rigidly attached to this bracket is a bent member having the two arms 88. A plane which just touches the ends of the arms 84 and 88 will be parallel to the axis of the body 65. It is necessary that this be true in order that the plumb bob 71 may be at zero when the ends of the arms 84 and 88 rest against a plane vertical surface. The use of this device is illustrated in Fig. 21 in which the arm 84 is shown as having its end resting against the felloe of a wheel, the arms 88 having been adjusted vertically until their ends rest against the felloe upon the opposite side of the hub. It is apparent that the wheel has an inclination with respect to a vertical plane. This should always be true with respect to the front wheels of an automobile. The specifications for each particular make and model of automobile indicate the amount of inclination of the plane of the wheel from a vertical plane and this is customarily expressed in degrees. I therefore prefer to graduate the arm 67 so that the number of degrees of inclination can be read directly from the scale. This can be done when the distance between the arms 66 and 67 is invariable but can not be done with instruments of this type in which the distance between these arms and the length of the plumb line are variable. For this reason, I consider it important that the distance between these two arms remain fixed. The distance between the arms 84 and 88 does not have to remain fixed for this reason and I therefore prefer to make one of these adjustable so that the implement may be used upon wheels of different sizes. It will be apparent from the foregoing that if the inclination, or cambre, of the wheel, as shown by the scale on arm 67, varies from the specifications for a particular automobile, the axle can be bent so as to make the reading accord with the specifications. Since the two arms 88 are the same length, the plane defined by the body 65 and the arms 66 and 67 will be perpendicular to the plane of the wheel and will be maintained so at all times by reason of the fact that the implement can not be rocked with relation to the wheels if the arms 88 are always kept in contact with the felloe of the wheel. Since the arm 67 is graduated both longitudinally and transversely, the arm 65 can be brought into a vertical plane by rotating the wheel until the point of the plumb bob 71 coincides with the longitudinal zero line on the arm 67. It will then be easy to read the cambre of the wheel by referring to the point of the plumb bob and the transverse graduations on the arm.

By providing a rod of proper dimensions and properly centering this in the openings of the yoke in which the knuckle is mounted, the ends of the arms 66 and 67 may be placed against this rod and the inclination of the axis of these openings from a perpendicular may be read on the scale on arm 67. If this reading is not the same as the reading when the arms 84 and 88 are placed against the felloe, it indicates that there is a bend somewhere between the yoke and the wheel. This bend can then be hunted up and corrected.

Figure 3:
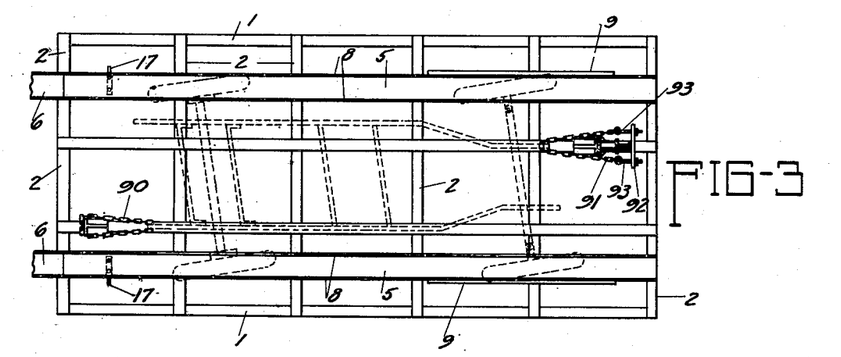
Figs. 3, 4 and 5 are more or less diagrammatic views illustrating some of the things which may be wrong with the frame of an automobile and the manner of curing these defects.
Figure 4:
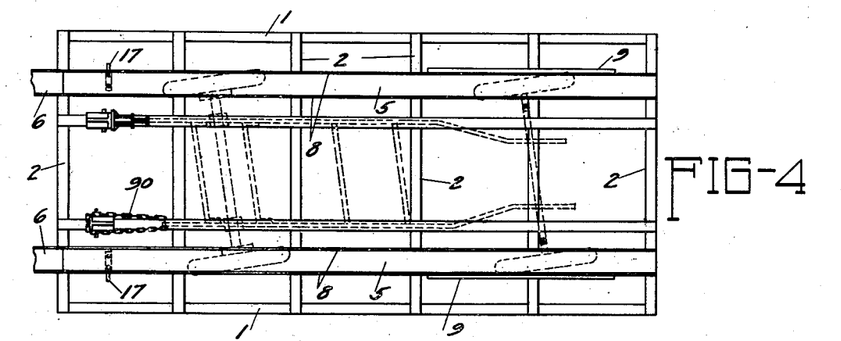

Reference will now be made to Fig. 22 for the description of another operation in which this implement is useful. By mounting the body 65 on the support 17, the body may be turned about this support as an axis until the plumb bob stands in a vertical position as indicated by the fact that it reads zero. The automobile can now be moved forwardly or backwardly until the end of rod 79 coincides with the axis point indicated on the end of the axle. Vertical adjustment of the bracket 77 may be necessary in order to secure this coincidence. Having now gotten one end of a rear axle directly over the support 17, the implement is taken to the other side of the car and mounted upon the other support 17 with the arms 66 and 67 pointing in the same direction, that is, either forwardly or rearwardly, as was the case when the device was first used. The implement is now plumbed up by means of the plumb bob 71 and it can be seen at a glance whether the end of rod 79 is in coincidence with the adjacent end of the rear axle. If it is not, and the automobile is standing properly on the tracks or runways 5, then there is an indication that the frame of the machine is not rectangular but that one side is farther forward than the other. Two different modes of correcting this error are shown in Figs. 3 and 4. It will of course be understood that in both of these figures the trouble is very much accentuated in order to indicate what is wrong. In Fig. 3 two of the knees shown in Fig. 14 are seen to be placed upon the two I-beams 7, the same facing in opposite directions. A chain 90 is placed around one of these knees and secured to the end of the automobile frame member, while a similar chain 91 is attached to the opposite end of the other frame member. The ends of this chain are illustrated as being secured to a plate 92 by means of screw eyes 93. A jack is located between the knee and the plate 92 and when force is applied thereto to cause extension of the ram the plate 92 will be pushed away from the knee and this side of the car frame will follow. Thus, the frame may be brought into rectangular condition again. In the arrangement shown in Fig. 4, the chain 90 and its cooperating knee are arranged as described above with reference to Fig. 3. The other knee, however, is arranged on the I-beam 7 rearwardly of the automobile and the jack is placed between this knee and the automobile frame so as to straighten the same by pushing instead of by pulling as in the previously described case.

Figure 5:
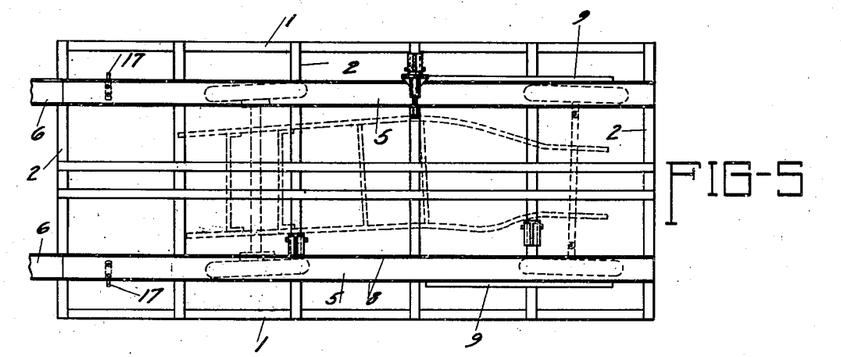

Fig. 5 illustrates the straightening of a frame when the two side members thereof have been bent in the same direction. This is accomplished by mounting two knees on two of the cross bars 2, upon one side of the car, placing another knee upon the opposite side of the car on another cross bar 2 and then placing a jack between this last mentioned knee and the side of the frame member. Now by applying force by means of this jack, the frame members may be pushed to one side to cause straightening of the frame. I believe this operation will be clear without further description thereof.

Figure 6:
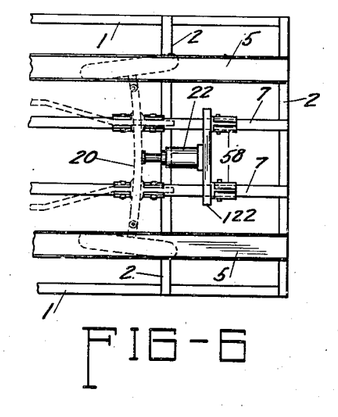
Figs. 6 and 7 are two fragmentary diagrammatic views illustrating the correction of faults existing in an automobile chassis.

In Fig. 6 is illustrated the straightening of a front axle which has been bent in a horizontal or in a substantially horizontal plane. In this figure there are shown two sets of plates 33 and 34 attached to the I-beams 7 and arranged upon opposite sides of the axle. A pair of knees such as illustrated in Fig. 14 are applied upon these two I-beams and a cross bar 122 stretches across between them on the side adjacent the automobile. A jack is now placed between this cross bar and the axle and the ram is extended to cause desired bending of the axle. This can then be brought back by this means into a straightened condition.

Figure 7:
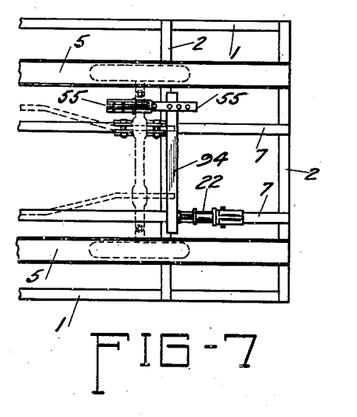

In Fig. 7 is illustrated the operation of removing a bend in a front axle when the bend occurs between the frame and the wheel. In this case, plates 33 and 34 are clamped to the I-beam 7 as in the preceding case, upon opposite sides of the axle. An implement such as illustrated in Fig. 15 is applied to the axle and a pin is inserted through a pair of holes 57 to hold the device properly assembled with the axle. A bar 94 is now inserted between the two sides of the U-shaped member and a pin is put through a pair of perforations to hold the parts in properly assembled relation. The bar 94 now rests against the forward edges of the plates 33 and the jack between the bar 94 and the knee on the second I-beam is actuated to transmit pushing force through the bar 94 and the members 55 to the end of the axle. This pushing force is converted into a pulling force and the axle is pulled in the direction of the front of the machine. This results in straightening the axle if one end is bent backwardly outside of the frame.

Reference was made above to the shoe 83 and the function of this device will now be described. If it be assumed that both ends of the rear axle have been tested by mounting the implement shown on sheet 6 upon the supports 17, it will be known whether the frame and rear axle are arranged at right angles to each other. If the car is not rectangular, one may proceed to correct the angularity of the frame before testing the front axle or he may test this before correcting the frame. We will assume that the rear axle has been tested and it is found that this makes right angles with the frame members. The implement shown in Figs 18 to 21 is then applied to the front end of the frame as shown in Fig. 22, with the shoe 83 riding on the gauge 9. This implement is then plumbed up by sliding it along the gauge bar 9 until the rod 79 engages the center of the front axle when the plumb bob 71 is over the zero line on the arm 67. When this has been done, a note is made of the reading on the gauge bar 9 and the implement is then taken to the opposite side of the frame and the operation is repeated with the other end of the front axle. Note is now made of the reading on this side and if the two readings differ it will be known that the front end of the automobile is not square. If this is found to be true, it will then be necessary to square up the frame by making the appropriate adjustments. From Figs. 19 and 20, it will be seen that the shoe may be applied to either end of the rod 81 so that the implement may be used in connection with either side of the automobile and still not be reversed when making the change from one side to the other.

The apparatus illustrated on Sheet 7 is another form of construction for the same purpose as the structures shown on Sheets 4 and 5. In reality it is preferred to those structures. Several parts in Figs. 25 to 29 are the same and bear the same reference numerals as in preceding figures.

Figure 25:
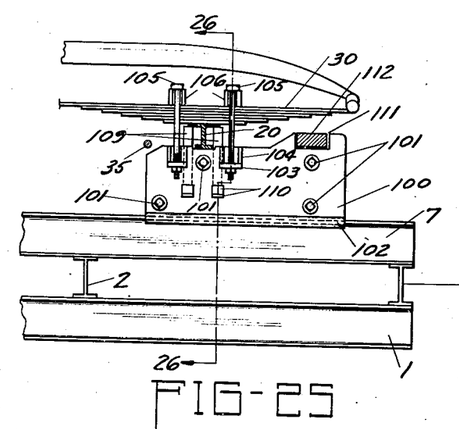
Fig. 25 is a vertical elevation, partly in section, of the structure as shown in Fig. 26, illustrating the use of another type of holding means for holding an automobile axle in position with relation to the supporting frame.
Figure 26:
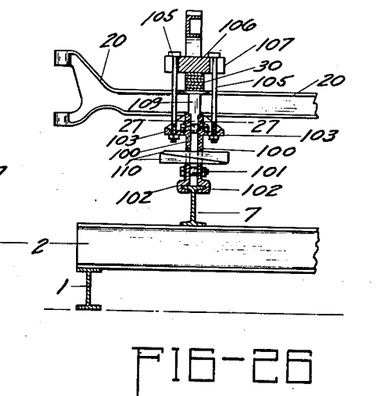
Fig. 26 is a fragmentary vertical cross section taken along the plane indicated by the broken line 26—26, Fig. 25.
Figure 27:
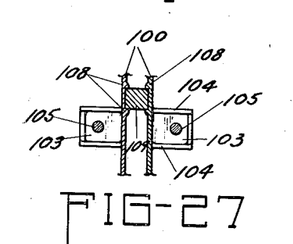
Fig. 27 is a horizontal section taken along the plane indicated by the line 27—27, Fig. 26.
Figure 28:
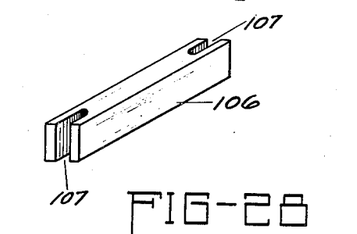
Fig. 28 is a perspective view of an element of the construction shown in Figs. 25 and 26.

A pair of plates 100, corresponding to plates 33 and 34 are secured together by bolts 101. These plates are provided along one edge, as indicated at 102, with grooves for engagement with the upper flanges of the I-beam 7. Spacers surround the bolts 101 and hold the plates a fixed distance apart. Adjacent their upper edges the plates have laterally extending brackets 103 which are connected at their lateral edges to the plates 100 by braces 104. Through the brackets 103 extend bolts 105 whose purpose will be presently set forth. A cross-bar 106, shown in detail in Fig. 28, has notches 107 in its ends for the reception of the bolts 105. These cross-bars, as shown in Figs. 25 and 26 are placed transversely of the springs 30 and are connected to the brackets 103 by the bolts 105. When the nuts are screwed on these bolts the axle 20 is held down tightly upon the upper edges of the plates 100.

The plates 100 are provided on their inner faces with ribs 108 which form guideways for slidable bars 109. Openings are formed through the plates 100 and oppositely disposed wedges 110 are passed therethrough. These wedges engage the lower ends of the bars 109 and force them upwardly against the spring 30 when the wedges are driven in. These assist the brackets in holding the springs rigid with relation to the plates 100.

Figure 29:
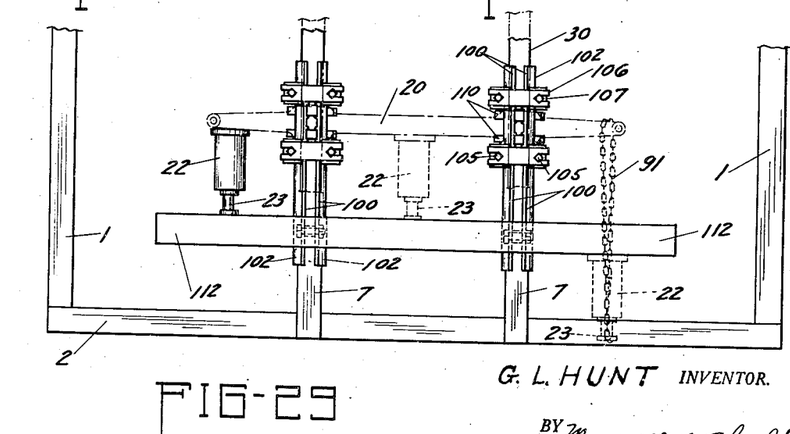
Fig. 29 is a fragmentary view of the front portion of the frame, the same indicating the location of some of the operating elements of this apparatus with relation to an automobile axle.

The upper edges of the plates 100 are notched as indicated at 111 and in these notches may be placed a bar 112 which serves as an abutment with which the jack 22 may cooperate in the straightening operation of an axle. Fig. 29 shows three of the possible positions which this jack may occupy in use. At the left side of this figure there is illustrated the operation of bending backwardly an end of an axle; at the middle of this figure is illustrated the bending backwardly of the middle of an axle; and at the right side the bending forwardly of an end of the axle, a chain 91 being used as in the case of Fig. 3.

It is of course understood that the specific description of structures and methods set forth above may be departed from without departing from the spirit of my invention as set forth in this specification and the appended claims.

Having now described my invention, I claim:

1. In a machine for the purpose indicated, a rigidly braced frame, runways thereon for the reception of an automobile, said runway being provided with wheel guides to insure proper positioning of the automobile wheels, measuring indicators in connection with the runways, and means cooperating with said indicators and an automobile on the runways to indicate the amount by which the automobile deviates from correct mechanical form.

2. In a machine for the purpose indicated, a rigidly braced frame, runways thereon for the reception of an automobile, measuring indicators in connection with the runways, and means cooperating with said indicators and an automobile on the runways to indicate the amount by which the automobile deviates from correct mechanical form, said frame having projections upon which said means may be mounted adjacent the hubs of a pair of wheels of the automobile.

3. In a structure for the purpose indicated, a frame comprising a pair of longitudinal rails, cross-ties connecting the rails and rigidly secured thereto, and runways for an automobile rigidly mounted on the cross-ties, said runways positioning the automobile's wheels in proper position for gauging measuring devices connected to the runways for checking the positions of the automobile wheels, and movable frame members for use in changing the shape of parts of the automobile.

4. In a structure of the character described, a frame comprising rigidly connected and braced frame elements, other frame elements carried thereby and laterally movable with relation thereto in substantially horizontal planes, abutments carried by the second mentioned frame elements and movable longitudinally thereof in a substantially horizontal direction, and means cooperating with the abutments and an automobile on the frame to cause alteration in form of the automobile frame.

5. In a portable structure of the character described, a frame comprising longitudinal frame elements, transverse frame elements rigidly connected thereto, other means serving as supporting means for an automobile rigidly connected to the transverse elements, and movable frame elements carried by the rigidly connected frame elements for movement in a substantially horizontal direction, adjustable abutments on the movable frame elements, and power means cooperating therewith in altering the form of automobile parts.

6. In a structure of the character described, a rigid framework having runways thereon for the reception of an automobile, movable frame elements extending horizontally, transversely of the frame and shiftable laterally into desired positions with relation to the automobile, abutments on the movable elements extending substantially vertically and adjustable longitudinally of said movable frame elements, and power means cooperating with the abutments in straightening an axle of an automobile carried on the runways.

7. In a structure of the character described, a rigid framework having runways thereon for the reception of an automobile, a movable frame element extending transversely of the framework and runways, said movable element being slidable longitudinally of the runways, means for holding said movable element down when an upward pull is exerted thereon, and axle holding members to connect an automobile axle to said movable frame element.

8. In a structure of the character described, a rigid framework having runways thereon for the reception of an automobile, a movable frame element extending transversely of the framework and runways, means for holding said movable element down when an upward pull is exerted thereon, axle holding members movably connected to the movable frame element to connect an automobile axle to said movable frame element, said movable element being slidable lengthwise of the runways, and means for exerting an upward pressure upon the axle.

9. In a mechanism for the purpose indicated, a rigid framework having runways thereon for the reception of an automobile, a movable frame element extending transversely of the framework and runways, and a pair of axle holding members to connect an automobile axle to said movable frame element, said holding members being elongated, each having a hook at one end, and having their opposite ends bent laterally in opposite directions when the hooks are arranged in the same direction.

10. In a mechanism for the purpose indicated, a rigid framework having runways thereon for the reception of an automobile, a movable frame element extending transversely of the framework and runways, and a pair of axle holding members to connect an automobile axle to said movable frame element, said holding members being elongated, each having a hook at one end and having their opposite ends bent laterally in opposite directions when the hooks are arranged in the same direction, in combination with means to support the axle above the framework and with the wheels out of contact with the runways, and means for applying a bending force to the axle.

11. In a mechanism of the character described, a holding member comprising a pair of U-shaped members having perforations through their bent portions, a member passing through said perforations and connecting the U-shaped members for swivelling motion with relation to each other, a pair of hooks connected to one of said U-shaped members for attachment to a part of an automobile, a threaded member adjustable lengthwise in said member connecting the U-shaped members and serving to clamp the hooks to the automobile part, and means in connection with the other U-shaped member whereby it may be attached to a relatively fixed member.

12. An automobile testing device comprising a body member having a pair of pins extending therethrough, means in connection with the body member for determining the relation which the body member bears to a vertical line, a supporting member pivotally mounted on one of the pins to support the device upon and cooperate with a measuring scale, and the other pin cooperating with an automobile axle, in combination with a scale to cooperate with said supporting member.

13. In a structure for the purpose indicated, a supporting framework having upper flanged elements extending longitudinally thereof, said elements having flanges upon opposite sides thereof, pairs of plates grooved along one edge for engagement with said flanges, means for rigidly attaching said plates to said flanged elements, apertured brackets extending laterally from said plates, cross bars for cooperation with said brackets and means for tying the crossbars and brackets together whereby a member to be operated upon may be rigidly clamped between such plates and crossbars.

14. In a structure for the purpose indicated, a holding frame, pairs of plates attachable to, adjustable with relation to, and detachable from said frame, said plates having portions thereof removed for the reception of a bar, a bar located in the openings formed in such plates, means for holding a part of an automobile frame securely clamped to said plates, and means to engage said bar and apply a bending force to the automobile part connected to said plates.

15. In a structure of the character described, a rigid framework having runways thereon for the reception of an automobile, a movable element, approximately coextensive in length with the axle of the automobile, extending transversely of the framework and runways and constituting an adjustable part of the framework, and axle-holding members to connect an automobile axle to said movable element, said axle-holding members being adjustable longitudinally of the runways by virtue of the adjustability of said movable element, and being also adjustable longitudinally of said movable element.

16. In a machine for the purpose indicated, supporting means comprising rigidly connected longitudinal and transverse beams and loosely mounted beams supported thereby, runways supported by the rigidly connected beams for the reception of the wheels of an automobile, an abutment on said supporting means, to be engaged by a part of the chassis, for the holding of the chassis against movement with relation to the said means, another abutment on said means to be engaged by force applying means whereby force may be applied to the chassis, and force applying means cooperating with the second mentioned abutment in the application of force for the purpose of altering the shape of the chassis or its constituent elements, said abutments being adjustable with relation to the rigidly connected beams, thus enabling them to be positioned according to the position of the chassis.

17. In a structure of the character described, a rigid framework having runways thereon for the reception of an automobile, movable frame elements extending horizontally longitudinally of the frame and shiftable into desired positions with relation to the automobile, abutments on the movable elements extending substantially vertically and adjustable longitudinally of said movable frame elements, and power means cooperating with the abutments in operating upon an automobile carried on the runways.

18. In a machine for the purpose indicated, a rigid framework having runways thereon for the reception of an automobile, movable frame elements resting on the rigid framework and extending longitudinally thereof, said movable frame elements being shiftable longitudinally and laterally of the framework, abutments on the movable frame elements extending approximately vertically and adjustable longitudinally of said movable frame elements, means to connect the automobile to one of said abutments, and power means to connect the automobile to another abutment whereby force may be applied in the altering of the shape of a part or parts of the automobile.

19. In a structure of the nature indicated, a supporting frame of rigid construction, movable frame elements carried thereby and shiftable with relation thereto, abutments carried by the movable frame elements and adjustable longitudinally thereof, said abutments extending approximately vertically into positions to cooperate in operating upon an automobile above the frame, and power means to exert force between the abutments and the automobile to cause changes in the form of the latter.

20. In a portable machine for operating upon deformed automobiles, a frame comprising rigidly connected longitudinal and transverse frame elements, runways for an automobile secured to said frame, movable frame elements carried by the rigidly connected frame elements for movement in a substantially horizontal direction, adjustable abutments on the movable frame elements, and power means cooperating therewith in altering the form of automobile parts.

21. In a structure of the character described, a rigid framework having runways thereon for the reception of an automobile, a movable frame element extending horizontally, transversely of the frame and shiftable into desired positions with relation to the automobile, abutments on the movable element extending substantially vertically and adjustable longitudinally of said movable frame element, and power means cooperating with the abutments in operating upon an automobile carried on the runways.

22. In a structure of the character described, a rigid framework having runways thereon for the reception of an automobile, frame elements extending horizontally, transversely of the frame and at least one of them shiftable into desired positions with relation to the automobile, abutments placeable and movable on some of the frame elements, said abutments extending substantially vertically and adjustable longitudinally of said transverse frame elements, and power means cooperating with one or more of the abutments in operating upon an automobile carried on the runways.

GEO. L. HUNT.